United States Patent [19]

Kamentser

[11] Patent Number: 4,706,503

[45] Date of Patent: Nov. 17, 1987

[54] VORTEX METER SENSOR

[75] Inventor: Boris A. Kamentser, Fountain Valley, Calif.

[73] Assignee: ITT Corporation, New York, N.Y.

[21] Appl. No.: 8,977

[22] Filed: Jan. 30, 1987

[51] Int. Cl.$^4$ .............................................. G01F 1/32
[52] U.S. Cl. .................................................. 73/861.24
[58] Field of Search .......... 73/861.22, 861.24, DIG. 4

[56] References Cited

U.S. PATENT DOCUMENTS

| | | | |
|---|---|---|---|
| 4,437,350 | 3/1984 | Tamura et al. | 73/861.24 |
| 4,625,564 | 12/1986 | Murakami et al. | 73/861.24 |
| 4,627,295 | 12/1986 | Matsubara et al. | 73/861.24 |

Primary Examiner—Herbert Goldstein
Attorney, Agent, or Firm—Menotti J. Lombardi

[57] ABSTRACT

A vortex meter sensor including an outer beam assembly having a receptacle formed therein for receiving therein an inner beam assembly. The outer beam assembly includes a sensor body with an integrally attached axially aligned outer cantilever beam member. The cantilever beam member has an upper tubular portion and a lower vane-shaped portion. The inner beam member is a unitary member with a flange portion for securing within a complementary portion of the receptacle, with a strain gauge beam member depending from the flange portion along with an axially aligned rod-shaped inner beam member. The inner beam member is configured for being received in spaced relation within the tubular portion of the outer beam member with the lowermost end of the inner beam member being secured to the lowermost end of the tubular portion.

15 Claims, 8 Drawing Figures

VORTEX METER SENSOR

BACKGROUND OF THE INVENTION

The background of the invention will be discussed in two parts.

FIELD OF THE INVENTION

This invention relates to vortex flow meters, and more particularly to an improved vortex meter sensor assembly of the general type described in the aforementioned application.

DESCRIPTION OF THE PRIOR ART

Vortex meters of current design use the localized fluid pressure fluctuations associated with the vortices produced by the bluff body to detect the vortex shedding frequency. The methods used to sense these pressures vary, but most use either a sealed, fluid-filled diaphragm-type differential pressure sensor, or use strain gages or force sensors to detect the forces caused by these pressures in some element of the bluff body.

In such prior art meters, strain gauges or piezoelectric sensors are coupled to flexing or vibrational elements for providing inputs to electrical circuitry which inputs are converted to a flow rate. In most of such prior art meters, the sensing element, usually a piezoelectric ceramic element, is exposed to the full temperature of the process fluid. Furthermore, many of the designs are as sensitive to accelerations from pipeline vibrations as they are to vortex pressures. In addition, many of the prior art meters require complete disassembly of the meter if the sensor should fail.

In accordance with an aspect of the present invention, it is an object to provide a new and improved vortex meter sensor.

SUMMARY OF THE INVENTION

The foregoing and other objects are accomplished by providing a vortex meter sensor including an outer beam assembly having a receptacle formed therein for receiving an inner beam assembly. The outer beam assembly is preferably a unitary assembly with a sensor body with an integrally attached axially aligned outer cantilever beam member. The cantilever beam member has an upper tubular portion and a lower vane-shaped portion. The inner beam member is a unitary member with a flange portion for securing within a complementary portion of the receptacle, with a strain gauge beam member depending from the flange portion and an axially aligned rod-shaped inner beam member. The inner beam member is configured for being received in spaced relation within the tubular portion of the outer beam member with the lowermost end of the inner beam member being secured to the lowermost end of the tubular portion. The sensor body of the outer beam assembly has an enlarged flange portion for being received within a mating recess formed in a meter housing with the outer cantilever beam portion being dimensioned for being received within an opening in a bluff body within the housing, the flange portion being configured for providing a bearing surface for coaction with the shoulder of the recess. The two parts are electron beam welded together to form a unitary sensor assembly.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

In the above referenced application, there is disclosed a vortex meter sensor assembly having a first part with a cantilever beam insertable within a second part affixed to a sensor body which has bearing surfaces and a flange that serve to locate and fix the sensor in the meter, the outer beam depending from the sensor body, with the upper portion of the outer beam being a hollow circular tube that serves as a flexure, the lower portion of the beam being solid and forming a vane that intrudes into a slot in the bluff body. An inner cantilever beam is provided in spaced relation within the hollow tube portion and secured therein at a point adjacent the bearing surfaces. A strain gage beam is secured to the inner beam and extends upwardly within the tubular portion, with a flexible link secured between the upper end thereof and the inner adjacent wall of the tubular portion. The sensor assembly is formed of many parts which require precision machining and a flexible link support of the upper end of the inner beam.

Figure 1:
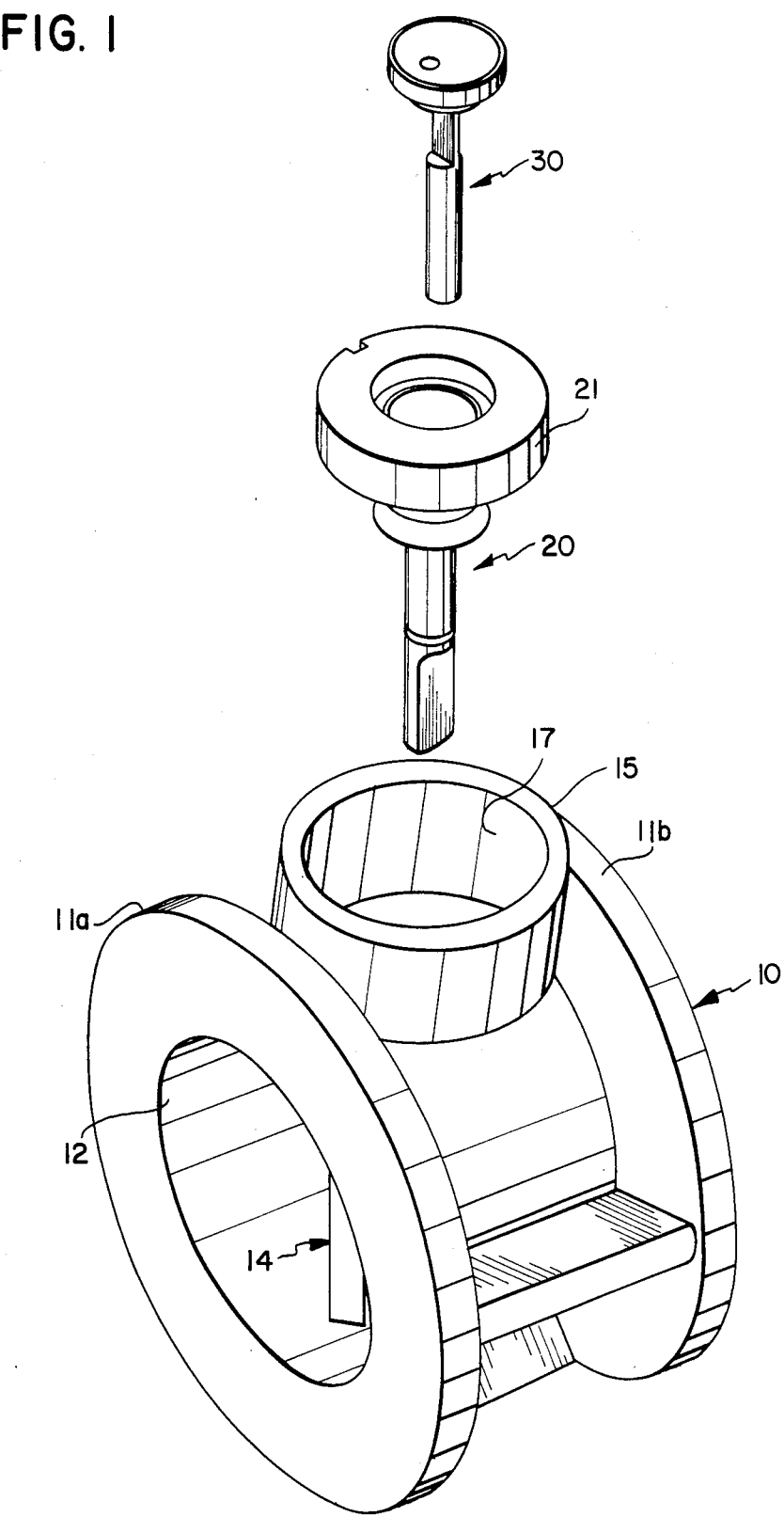
FIG. 1 is an exploded perspective view of the components of the vortex meter sensor assembly according to the invention in relation to a meter housing body for receiving the same.

In accordance with the present invention, the sensor assembly of the instant application is an improvement over that assembly, requiring less complex machining and assembly, while requiring, basically, two parts which are electron beam welded to provide a unitary sensor assembly. Referring now to the drawings, and particularly to FIG. 1, there is shown an improved vortex meter assembly according to the invention, which includes a meter housing, generally designated 10, the housing 10 having flanged ends 11a and 11b for connection to a fluid flow pipeline, and a generally centrally disposed fluid flow opening or tubular conduit 12 of generally circular cross-section, with the fluid flow being directed in the direction of the axis of the conduit 12.

A bluff body, generally designated 14, is secured to the housing 10, within the conduit 12 in a direction extending transverse to the direction of fluid flow, that is, generally perpendicular to the axial centerline of the conduit 12. As is known in the art of vortex meters, the bluff body 14 acts as an obstacle to fluid flow, and has a cross-sectional configuration intended to give rise to periodic vortices, the sensing and measurement of which can be translated to fluid flow rates. Such bluff bodies, for example may have a wedge-shaped configuration with the apex thereof being located for initial contact with the oncoming fluid. The vortices created by the obstacle, or bluff body 14, cause the fluid pressure to be different on the two sides of the bluff body 14. A sensor well in the form of a slot (not shown) extends through the bluff body 14 in a direction perpendicular to the direction of fluid flow and perpendicular to the longitudinal axis of the bluff body 14. Reference may be had the aforementioned application for details pertaining to the housing and bluff body, the details of which are not necessary to an understanding of the present invention.

The upper end 15 of the housing 10 is generally circular in cross-section, and is provided with a stepped circularly cross-sectioned sensor receiving chamber 17 for receiving therein the outer beam assembly, generally designated 20, which, in turn receives therein the inner beam assembly, generally designated 40, with both assemblies constructed of metal, preferably the same metal or different metals of the same coefficient of thermal expansion. Although not shown, the interior of the bluff body and the cooperating portions of the housing 10 are configured for receiving therein the sensor assembly according to the invention, that is components 20 and 40, with a vane portion within a slot in the bluff body for coaction with flowing fluid to provide the necessary vortex sensing interface.

Figure 2:
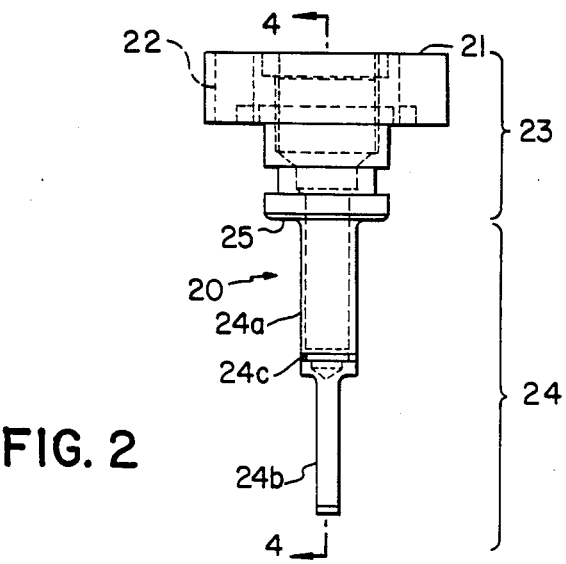
FIG. 2 is a side elevational view of the outer tube assembly of the sensor assembly of FIG. 1.
Figure 4:
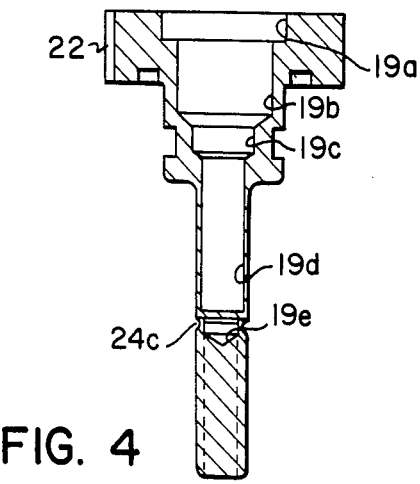
FIG. 4 is a cross-sectional view of the outer tube assembly of FIG. 2, as viewed generally along line 4—4 thereof.
Figure 3:
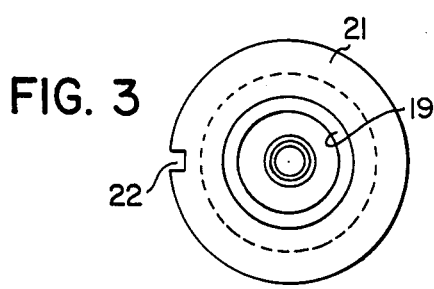
FIG. 3 is a top plan view of the outer tube assembly of FIG. 2.
Figure 8:
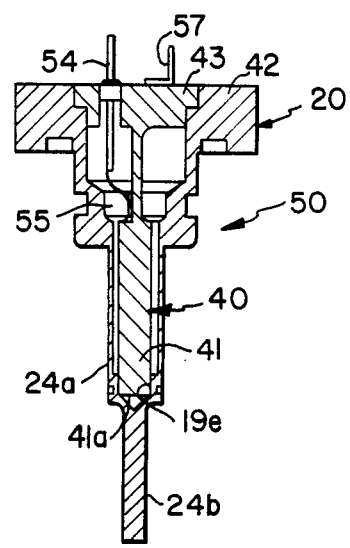
FIG. 8 is a cross-sectional view of the assembled vortex meter sensor assembly in accordance with the invention, which figure is similar to FIG. 4 and shows the inner beam tube assembly of FIG. 5 inserted within the outer tube assembly of FIG. 2.
Figure 5:
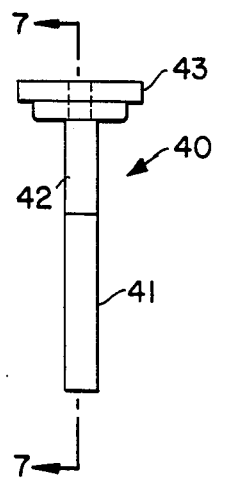
FIG. 5 is a side view of the inner beam tube assembly of the sensor assembly of FIG. 1.
Figure 6:
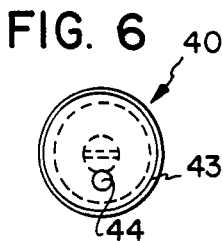
FIG. 6 is a top plan view of the inner beam tube assembly of FIG. 5.
Figure 7:
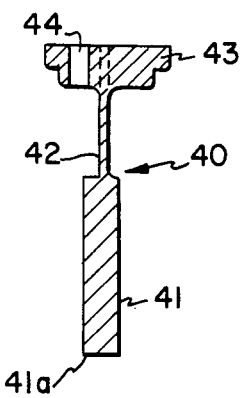
FIG. 7 is a cross-sectional view of the inner beam tube assembly of FIG. 5, as viewed generally along line 7—7 thereof.

Referring also to FIGS. 2 through 8, the sensor assembly, generally designated 50 is shown in FIG. 8 and includes the inner beam assembly 40 (FIGS. 5-7) inserted within and affixed to the outer beam assembly 20 (FIGS. 2-4). As shown in FIGS. 2 through 4 and 8, upper end of the outer beam assembly 20 has an enlarged flange portion 21 configured and dimensioned for being matingly received within the upper portion 19a of a receptacle 19 configured for receiving the inner beam assembly therein. The flange 21 is provided with an axially extending peripheral key slot 22 for enabling keying of the member 20 to the housing 10 to align the vane portion thereof within the slot of the bluff body 14.

The cantilever outer beam assembly 20 is formed as a one-piece unitary structure and includes a sensor body 23 (of which the flange 21 is a part) integrally formed therewith and an outer cantilever beam member 24, the length of the sensor body 23, as shown in FIG. 2 being slightly less than the upper half, with the outer beam member 24 being the balance of the length of the device. The sensor body 23 is of generally circular cross-section, with the axis thereof being concentric with flange 21.

The outer cantilever beam member 24 extends down from the sensor body 23 is axial alignment therewith, that is, the longitudinal centerline of the outer beam member 24 is along the longitudinal centerline of the sensor body 23 with the center of the circular flange 21 defining the center of the assembly. The upper portion 24a of the cantilever beam member 24 is a generally elongate hollow circular tube that serves as a flexure and as the pressure boundary of the sensor assembly 50 (See FIG. 8). The lower portion of the outer beam member 24 is solid and is flattened to form a paddle or vane 24b, the long dimension of which extends in general alignment with the axis of the conduit 12. The length of the outer beam member 24 and the dimensions and location of the slot within the bluff body 12 are such that the vane 24b extends into the slot for being acted upon by the vortices created during fluid flow.

At the junction of the outer cantilever beam 24 with the sensor body 23, a bearing surface 25 is formed for engagement with a corresponding bearing shoulder within the chamber 17 of the housing 10. The flange 21 serves to locate and fix the outer beam assembly 20 in the meter housing 10.

For receiving the inner beam assembly, the receptacle 19 of the outer beam assembly is generally hollow with the parts thereof, for top to bottom, including the circular recess portion 19a for matingly receiving the flange 21, a smaller diameter, and somewhat longer, portion 19b which forms a well or chamber, a yet smaller diameter portion 19c, an elongate smaller diameter inner beam receiving portion 19d, and a yet smaller diameter inner beam end receiving portion 19e.

The inner cantilever beam 40 is of a one-piece unitary construction in which the inner beam member 41 is generally elongate and of approximately the same length as the tubular portion 24a. The member 41 is integrally formed with a strain gauge beam member 42 and a stepped mounting flange portion 43, with the strain gauge beam 42 intermediate the inner beam member 41 and the flange portion 43. The upper part of flange portion 43 is dimensioned to be received within the portion 19a of receptacle 19, with the lower part of flange portion 23 dimensioned to be received within the upper part of portion 19b of receptacle 19 in snug fitting relation. The flange portion 43 is of an enlarged mass compared to the dimensions of the strain gauge beam member 42 and is provided with an axially extending aperture 44 for providing electrical lead access and for sealing the electrical lead 54 to a strain gauge 55 (in this case a piezoelectric ceramic element) bonded to the broad surface of the strain gauge beam member 42 (See FIG. 8). The strain gauge beam member 42 is bar or strip shaped and of rectangular cross-section, with the long width dimension being in coplanar relation with the long width dimension of the vane 24b. As shown in FIG. 8, the short width dimension of the strain gage beam member 42 is much less than the diameter of the inner beam member 41 to which it is integrally attached, the dimensional ratio being about one-third. The inner beam member 42 is generally solid, of generally uniform circular cross-section and rod shaped, with the outer diameter thereof slightly smaller than the inner diameter of the tubular portion 24a of the outer beam member 24. The inner cantilever beam member 41 has a length generally equal to the length of the tubular portion 24a of the outer beam member 24.

As shown in FIG. 8, the inner beam member 41 depends into, and is in concentric relation with the inner wall of the interior of the tubular outer beam portion 24a of the outer beam 24, with an annular clearance gap formed between the periphery of the outer wall of inner beam member 41 and the interior wall of the tubular outer beam portion 24. The lowermost end 41a of the inner beam member 40 is fitted within the mating recess 19e at the lower end of the tubular portion 24a of the outer beam member 24. With this peripheral spacing and end connection, inner beam member 41 is allowed to flex without contacting the interior wall of the tubular portion 24a of the outer beam member 24.

Upon assembly, the strain gauge 55 is attached to the strain gauge beam 42 of the inner beam assembly. The electrical lead 54 of the gauge 55 is passed through the aperture 44 in flange 23 and suitably sealed, such as with a glass bead, with the end of lead 54 external to the assembly providing a first electrical contact point. An L-shaped electrical contact member 57 is secured to the upper surface of the flange 43 to provide a ground connection. The inner beam assembly is then inserted within the receptacle 19 with the flange 43 fitting snugly within recess portion 19a of receptacle 19 and the lower end 41a of inner beam 41 fitting within the recess 19e. The fit between the end 41a of inner beam member 41 and the recess 19e need not be precise, and can be a somewhat sloppy fit. Thereafter, by use of electron beam welding, the lower end 41a is bonded within recess 19e, and the flange 43 is bonded to the adjacent surface of flange 21 within recess 19a. To facilitate the welding, the outer surface of the outer beam 24 is provided with an annular recess 24c which lies in coplanar relation to the inner beam receiving recess 19e to provide a thin wall area at the weld region. Electron beam welding may be readily accomplished through the metal walls of the structure to provide a strong, leaktight connection, and facilitates manufacture and assembly of the sensor assembly 50. The end of the tube fits relatively sloppy into the hole in the end of the inner chamber of the vane. The electron beam process welds the end of the beam with the vane through the wall of the chamber providing a strong and leaktight connection.

With the sensor assembly 50 thus assembled, and primarily comprising two parts or components welded together, the assembled sensor assembly 50 is rigid and practically one-piece, thus improving performance. Furthermore, with the inner beam assembly 40 essentially welded to and supported within the outer beam assembly 20 at two points, that is, at the top and at the very bottom, forces transmitted to the strain gauge beam 42 are consistently reproducible and provide increased sensitivity, and hence, increased output from the strain gauge 55. With this construction, movement of the vane portion 24b causes flexure of the outer beam member 24 which will be transmitted through this solid coupling to the inner beam member 41, and ultimately cause flexure of the strain gauge beam member 42, which flexure will be detected by the strain gauge 55, which movement is then translated into electrical signals.

Dimensionally, and by way of example only, the overall length of the sensor assembly 50 is less than one and three-quarter inch. The overall length of the outer beam member 24 is approximately 1.03 inches, with the length of the vane 24b being less than one-half inch with a thickness of about 0.08 inch. The outer diameter of the upper portion 24a of the outer beam member 24 is approximately 0.186 with the inner wall thereof having a diameter of about 0.160 inch. The outer diameter of the inner beam member 41 is about 0.120 inch, resulting in an annular clearance gap of 0.020 inch between the inner beam member 41 and the adjacent interior wall of the upper portion 24a of the outer beam member 24.

In accordance with the present invention, there has been described a cantilever beam sensor assembly 50, formed of two readily producible parts 20 and 40, assembled with a minimum of fabrication time, that is, two weld points, to produce a rigid, reliable, sensitive, economical sensor assembly 50. In the context of the present specification, the terms upward, downward, suspended, or depending, and like directional terms, are used with reference to the orientation in the drawings and are not intended to be limiting. While there have been shown and described preferred embodiments, it is to be understood that various other adaptations and modifications may be made within the spirit and scope of the invention.

What is claimed is:

1. A vortex sensor apparatus for a vortex fluid flowmeter comprising:
   (a) an outer beam assembly including
      (i) a sensor body means including flange means for securing said assembly within the housing of the flowmeter;
      (ii) an outer cantilever beam member affixed to said sensor body, said outer beam member having a first generally tubular portion and a second vane portion integrally attached to and in alignment with said first portion;
      (iii) receptacle means in said sensor body including the interior of said tubular portion;
   (b) a unitarily formed inner beam assembly having a first and second end including
      (i) first end means for securing the first end of said inner beam assembly within said receptacle means;
      (ii) a generally rod-shaped inner beam member having a diameter slightly smaller than the inner diameter of said tubular portion for being received within said tubular portion in spaced relation to the interior thereof;
      (iii) a generally bar-shaped strain gauge beam member intermediate said inner beam member and said first end securing means for receiving thereon a strain gauge element; and
   second end means for securing the second end of said inner beam member within said tubular portion.

2. The apparatus according to claim 1 wherein said outer beam assembly is a unitary assembly.

3. The apparatus according to claim 1 wherein said first end means for securing the first end of said inner beam assembly includes flange means.

4. The apparatus according to claim 3 wherein said second end means for securing the second end of said inner beam member includes recess means within said tubular portion for receiving said free end.

5. The apparatus according to claim 1 further including flexure sensing means affixed to said strain gauge beam member.

6. The apparatus according to claim 1 wherein said sensor body means are provided with bearing means for coaction with shoulder means within a meter housing.

7. The apparatus according to claim 1 wherein said inner beam member is elongate in form and generally equal in length to said tubular portion.

8. A vortex sensor apparatus for a vortex fluid flowmeter comprising:
   (a) a first unitary beam assembly including
      (i) sensor body means including means for securing said assembly within the housing of the flowmeter;
      (ii) outer beam means affixed to said sensor body means, said outer beam means having a first portion with a generally tubular interior and a second portion integrally attached to and in alignment with said first portion;

(iii) receptacle means in said first beam assembly including the generally tubular interior portion;

(b) a unitarily formed second beam assembly having a first and second end including (i) first end means for securing the first end of said second beam assembly within said receptacle means;

(ii) inner beam means dimensioned and configured for being received within said tubular interior portion with the periphery thereof in spaced relation to the tubular interior portion;

(iii) a beam member of cross-section smaller than said inner beam means intermediate said inner beam means and said first end securing means for receiving thereon flexure sensing means; and second end means for securing the second end of said inner beam member within said tubular portion.

9. The apparatus according to claim 8 wherein said inner beam means has a length approximately equal to the length of said tubular interior portion.

10. The apparatus according to claim 8 wherein said inner beam means is a solid rod member of generally circular cross-section and said beam member of smaller cross-section has a generally rectangular cross-section.

11. The apparatus according to claim 9 wherein said rod member is generally elongate.

12. A vortex fluid flowmeter comprising:

(a) housing means having a conduit for fluid flow therethrough;

(b) bluff body means attached to said housing means and extending within said conduit, said bluff body means having means for communicating with the flow of fluid through said conduit;

(c) chamber means within said housing means and said bluff body means for receiving therein a sensor means;

(d) a first unitary beam assembly including (i) sensor body means including means for securing said assembly within said chamber means;

(ii) outer beam means affixed to said sensor body means, said outer beam means having a first portion with a generally tubular interior and a second vane portion integrally attached to and in alignment with said first porton, said vane portion being dimensioned and configured for being received with the bluff body means;

(iii) receptacle means in said first beam assembly including the generally tubular interior portion;

(e) a unitarily formed second beam assembly having a first and second end including (i) first end means for securing the first end of said second beam assembly within said receptacle means;

(ii) inner beam means dimensioned and configured for being received within said tubular interior portion with the periphery thereof in spaced relation to the tubular interior portion;

(iii) a beam member of cross-section smaller than said inner beam means intermediate said inner beam means and said first end securing means for receiving thereon flexure sensing means; and (f) second end means for securing the second end of said inner beam member within said tubular portion.

13. The flowmeter according to claim 12 wherein said first and second beam assemblies are formed of metal.

14. The flowmeter according to claim 13 wherein said inner beam means is generally elongate and generally of the same length as said tubular interior portion.

15. The flowmeter acording to claim 14 wherein said inner beam means is formed as a generally solid generally rod-shaped member.

* * * * *